Patented May 19, 1942

2,283,199

UNITED STATES PATENT OFFICE 2,283,199

DETERGENT

Lawrence H. Flett, Hamburg, N. Y., assignor to Allied Chemical & Dye Corporation, a corporation of New York No Drawing. Application July 30, 1936, Serial No. 93,521

27 Claims. (Cl. 260—505)

This invention relates to improvements in alkyl aromatic sulfonates useful as detergent, wetting, penetrating, emulsifying and like agents, and the manufacture thereof. It relates particularly to improvements in alkyl aromatic sulfonate detergents and their manufacture for use in washing, laundering, scouring, cleaning and like processes of removing dirt, grease, etc. from materials of various kinds, as well as for use as toilet preparations.

In my copending application Serial No. 737,777, filed July 31, 1934, of which the present application is a continuation-in-part and which is a continuation-in-part of my co-pending application Serial Nos. 691,081 and 691,082, filed September 26, 1933, I have disclosed the production of mixtures of sulfonated products of the type AHRS obtained from petroleum distillates (A representing an aromatic nucleus which may contain substituents, H representing a nuclear hydroxyl group, R representing a nuclear alkyl group containing not less than 7 carbon atoms, and S representing a nuclear sulfonic acid group which may be in the form of a free acid or a salt thereof).

According to the present invention, detergent, wetting, emulsifying and related compositions comprising mixtures of aromatic sulfonates containing higher alkyl groups as substituents, in which said higher alkyl groups are derived from aliphatic hydrocarbon mixtures of a restricted boiling range, are obtainable by processes comprising halogenation of an aliphatic hydrocarbon mixture of restricted boiling range, condensation of the resulting halogenated products or selected fractions thereof with an aromatic compound, and sulfonation of the resulting products or selected fractions thereof. Generally the sulfonated products are converted to their corresponding salts for use.

I have found, according to the present invention, that mixtures of aliphatic hydrocarbons of a boiling range restricted to correspond with mixtures of hydrocarbons of which at least 80 per cent have an empirical carbon content (based on the boiling points of the hydrocarbons) not less than 12 and not more than 19 carbon atoms per molecule, constitute a valuable source of aliphatic radicals for the production of the mixed alkyl aromatic sulfonates. I have found furthermore, according to the present invention, that mixtures of alkyl aromatic sulfonates in which the alkyl groups are derived from aliphatic hydrocarbons of the said boiling range are particularly valuable as detergent compositions, being much superior to soaps derived from higher fatty acids in many respects. Thus, I have found, by chlorinating a petroleum distillate, such as a kerosene fraction of Pennsylvania petroleum, of which at least 80 per cent boils over a maximum range of 55° C. between the limits 210° and 320° C., condensing the chlorination product with an aromatic compound, and sulfonating the resulting condensation product, compositions are obtained which, in the form of the free sulfonic acids or their salts (especially the latter), are useful for detergent, cleansing, wetting and other purposes. (Boiling temperatures referred to herein are at atmospheric pressure unless otherwise stated.) The method of determining the boiling ranges for the purposes of this invention is that described by Weiss in Journal of Industrial & Engineering Chemistry, vol. 10 (1918), pp. 1006–1008.

The alkyl aromatic sulfonates of the present invention have the advantageous properties of being excellent washing agents which are very effective under widely different conditions, for example, in baths of hard or soft water; under acid, neutral, or alkaline conditions; in the presence or absence of water insoluble solvents; and in concentrated or very dilute solutions.

As is well known in the art, petroleum distillates are mainly mixtures of aliphatic hydrocarbons, including both saturated acyclic aliphatic hydrocarbons containing straight or branched carbon chains and cyclic aliphatic hydrocarbons, as well as some unsaturated aliphatic hydrocarbons, depending upon the source of the petroleum and the method of distillation and/or purification. When the petroleum distillates are halogenated in the preparation of products of the present invention, mixtures of various halogenated derivatives of the said aliphatic hydrocarbons are produced (which are generically referred to herein as "alkyl halides"), and the said mixtures of alkyl halides, when condensed with aromatic compounds, produce mixtures of alkyl aromatic compounds, in which the alkyl groups correspond with aliphatic hydrocarbons of the petroleum distillate from which they were produced. Accordingly, when the mixtures of alkyl aromatic compounds are sulfonated, compositions are produced which contain mixtures of sulfonated alkyl aromatic compounds duffering from each other in the alkyl groups, which groups correspond with the aliphatic hydrocarbons of the mixture employed.

The present invention thus has the additional advantage that it provides a relatively simple and direct method of producing products having valuable detergent and other properties from raw material which is readily available in large quantities; thereby making feasible the economical production of such products on a commercial scale.

The hydrocarbon mixtures employed as starting materials in accordance with the present invention are the aliphatic hydrocarbon mixtures, and especially mineral oil distillates, of which at least 80 per cent boils (distills) over a maximum range of 55° C. (and preferably over a maximum range of 30° C.) and between 210° and 320° C. Distillates of this type are believed to contain aliphatic hydrocarbons of which at least 80 per cent contain between 12 and 19 carbon atoms per molecule.

Without limiting the invention to any theoretical explanations, it appears that the presence of mixtures of related alkyl aryl sulfonates enhances the solubility and the detergent and wetting action of the products, while the restriction of the boiling range and quality of the aliphatic hydrocarbon mixtures employed results in greater uniformity in the degree of chlorination among the respective hydrocarbons and hence in improved quality of the sulfonated products, with resultant improved detergent action.

The aliphatic hydrocarbon mixtures preferably employed vary somewhat among themselves, within the above limits, depending upon the type of alkyl aromatic compound into which they are converted. Thus, for the production of mixed alkyl aromatic sulfonates derived from aromatic compounds of the benzene series containing a solubilizing group in addition to the sulfo group (as in the case, for example, of phenol, cresol, etc., derivatives), a hydrocarbon mixture of the above type is preferably employed of which at least 80 per cent boils over a maximum range of 55° C. (and preferably a maximum range of 30° C.) and between 235° and 320° C., which boiling point limits are believed to correspond with hydrocarbons containing mainly 14 to 19 carbon atoms per molecule; whereas, for the production of mixed alkyl aromatic sulfonates derived from aromatic compounds of the benzene series free from a solubilizing group other than the sulfo group, a hydrocarbon mixture of the above type is preferably employed of which at least 80 per cent boils over a maximum range of 55° C. (and preferably a maximum range of 30° C.) and between 210° and 265° C., which boiling point limits are believed to correspond with hydrocarbons containing mainly 12 to 16 carbon atoms per molecule.

The boiling point range of the hydrocarbon mixtures employed may vary with respect to the boiling point limits thereof; provided at least 80 per cent thereof, and preferably at least a middle 80 per cent thereof, has the boiling characteristics above referred to. Thus, hydrocarbon material of which the first 10 per cent boils considerably below the preferred lower limit and/or the last 10 per cent boils considerably above the preferred upper limit may be employed in accordance with the present invention, if it has the characteristics herein referred to.

The preferred hydrocarbon mixtures employed in accordance with the present invention are exemplified by fractions of Pennsylvania and Michigan (Mount Pleasant) petroleum distillates in the ranges mentioned above, and especially those whose boiling point limits are 210° and 290° C. These distillates consist essentially of open chain aliphatic (paraffinic) hydrocarbons a large portion of which are probably relatively long carbon chains rather than more condensed molecules. Such distillates will be referred to as "of the Pennsylvania type," whether derived from natural sources or derived by processing or by purification of less favorable distillates from other sources.

The alkyl aromatic sulfonates of the present invention may be derivatives of various aromatic hydrocarbons, as for example, benzene, toluene, xylene, diphenyl, naphthalene, anthracene, etc. They may contain one or more substituents in the aromatic nucleus, in addition to the alkyl group derived from the said hydrocarbon, of which the following are illustrative: —OH; OX, where X is an alkyl or aralkyl group containing one to eight carbon atoms; —COOMe, where Me is an alkali metal, ammonium or water-soluble organic basic cation; —COO alkyl; —NO₂; —NH₂; —NH alkyl; or

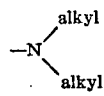

The products derived from aromatic compounds of the benzene series are preferred. Further, the products in which the alkyl hydrocarbon radicals, derived from the aliphatic hydrocarbons above referred to, are attached to carbon atoms of the aromatic nucleus are preferred.

The said alkyl aromatic sulfonates may be in the form of the free sulfonic acid or in the form of a salt; for example, a salt resulting either from the replacement of the hydrogen of said sulfonic acid group with its equivalent of a metal (preferably an alkali metal) or from the addition of ammonia or an organic base.

In preparing the sulfonated products in accordance with one preferred method of procedure, an aliphatic hydrocarbon distillate of the character described above is chlorinated or otherwise halogenated, for example, in accordance with known processes for the production of chlorinated or other halogenated derivatives of aliphatic hydrocarbons, whereby mixtures comprising chlorinated or other halogenated aliphatic hydrocarbons are produced; an aromatic hydrocarbon, or derivative, adapted to provide the desired aryl radical of the product is then converted to a mixture of alkyl aromatic compounds by a process including reaction of the aromatic compound with the mixed chlorinated or other halogenated aliphatic hydrocarbons, or with a selected portion thereof; and the resulting mixture of alkyl aromatic compounds, or a selected portion thereof, is then sulfonated with or without previous conversion to further derivatives thereof. The resulting mixture of sulfonic acids is preferably converted into a mixture of their corresponding salts. If inorganic salts are simultaneously formed, they may be left in the mixture of said sulfonic acid salts, or they may be separated therefrom, as the use of the product may determine.

The invention will be illustrated by the following specific examples. It will be realized by those skilled in the art that the invention is not limited thereto, except as indicated in the appended patent claims. The parts are by weight, the temperatures are in degrees centigrade and the pressure is atmospheric pressure, unless otherwise indicated.

*Example 1.*—A Pennsylvania petroleum distillate (kerosene) which distills from about 200° to about 266°, and of which about 80 per cent distills over the range of about 220° to 260°, and which comprises substantially a mixture of hydrocarbons which are chiefly aliphatic and saturated, is chlorinated at about 50° by passing through it a stream of chlorine gas until the chlorinated mixture has increased in weight by about 20 per cent because of organically-combined chlorine therein. The resulting mixture of unchlorinated and chlorinated hydrocarbons is aerated to remove practically all dissolved hydrogen chloride. The chlorinated hydrocarbons in the mixture contain a preponderant amount of monochlor hydrocarbons.

*Example 2.*—Chlorine is passed into a kerosene (a purified Pennsylvania petroleum distillate) boiling from 245° to 315°, and of which 90 per cent distills between 260° and 305°, and having a specific gravity of 0.815, contained in a closed, lead-lined vessel which is equipped with a vent for hydrogen chloride produced by the chlorination. The chlorination is carried out in the dark, but to facilitate the chlorination the kerosene initially contains about 0.45 part of iodine per 1000 parts of kerosene. The temperature of the reaction mass is preferably maintained at about 45° to 50°. The introduction of chlorine is continued until the weight of the mass increases to an extent corresponding substantially with 115 per cent of the theoretical amount for the formation of the monochloride. The specific gravity of the reaction mixture reaches about 0.915.

*Example 3.*—Pennsylvania kerosene is fractionated and 300 parts of the distillate therefrom boiling from about 240° to 260° is chlorinated in a suitable reactor by passing chlorine gas slowly into the distillate at a temperature of about 55° until its weight has increased, because of organically combined chlorine, to 353 parts. Dissolved hydrogen chloride is reduced to about 1.2 parts by aeration.

The chlorinated distillate is substantially a mixture of chlorinated and unchlorinated open chain saturated hydrocarbons which have an average molecular carbon content of about 14 carbon atoms. The chlorinated hydrocarbons in the mixture comprise about equal amounts of mono and polychlorinated hydrocarbons. By distillation, the mixture can be separated into three fractions which respectively contain substantially the unchlorinated, monochlorinated and polychlorinated hydrocarbons.

*Example 4.*—A Pennsylvania petroleum distillate, 90 per cent of which distills from about 265° to about 303° is selected as a mixture which contains a preponderating amount of open-chain saturated hydrocarbons which have an average carbon content of 16 to 17 carbon atoms per molecule. In a suitable reactor, 623 parts of such a distillate are chlorinated by passing a stream of chlorine gas through the said distillate while it is exposed to diffused sunlight and maintained at about 60°. Chlorination is continued until the distillate has increased in weight to about 729 parts because of organically-combined chlorine therein. Dissolved hydrogen chloride in the chlorinated mixture is reduced to about 2 parts (0.3 per cent HCl) by aeration for about 15 minutes. The increase is approximately 115 per cent of the theoretical increase required for monochlorination of the hydrocarbons in the distillate.

The chlorinated distillate is chiefly a mixture of unchlorinated and chlorinated open chain saturated hydrocarbons with from about 16 to about 17 carbon atoms in their molecules. The predominating chlorinated hydrocarbons in the mixture are the monochlor hydrocarbons.

*Example 5.*—Part 1: 30 parts of anhydrous aluminum chloride are added slowly to an agitated mixture of 200 parts of benzol and 300 parts of a mixture containing chlorinated and unchlorinated hydrocarbons and prepared as described in Example 1. The mixture is cooled externally until the vigorous evolution of hydrogen chloride gases from the mixture has abated. It is then heated and maintained at its refluxing temperature for about one hour, or until the evolution of hydrogen chloride has ceased. The reacting mass is cooled and drowned with a mixture of about 400 parts of crushed ice, 200 parts of water and 50 parts of commercial muriatic acid. The mixture is allowed to stratify, the organic oily layer above the aqueous solution is separated, washed with a small amount of water, and distilled. The portion which distills from about 160° to about 210° at 4 mm. of mercury pressure is collected and consists of a mixture of alkylated benzenes in which the alkyl groups predominantly contain from about 12 to about 15 carbon atoms. The resulting mixture is a light amber-colored, somewhat oily, but not viscous, liquid which is insoluble in water, but soluble in the common organic solvents.

Part 2: 100 parts of the distilled oil obtained according to Part 1 of this example are mixed with 130 parts of 20 per cent oleum at a temperature of approximately 10°. The mixture is allowed to warm to 25° to 30° and is stirred at this temperature for 1½ to 3 hours or until one part of a test portion, after neutralizing with sodium hydroxide, is soluble in 20 parts of water. The mixture is then poured into approximately 600 parts of an ice-water mixture, and the resulting solution is made neutral to Brilliant Yellow and Congo red papers with caustic alkali (e. g., sodium hydroxide). The neutralized solution is evaporated to dryness on a rotary drum drier. The product obtained is in the form of light-buff to white flakes. It comprises chiefly a mixture of alkyl benzene sulfonates and alkali metal sulfate. Aqueous solutions of the product have excellent washing properties, as well as good wetting, insecticidal, and fungicidal properties.

*Example 6.*—Part 1: 150 parts of a crude chlorinated kerosene mixture of the type produced in the above Examples 1 to 4, 90 parts of naphthalene, and 25 parts of anhydrous zinc chloride are thoroughly mixed by agitation and heated to about 135° in a reactor fitted with a reflux condenser. The mixture is kept at about 135° for about 45 minutes or until the evolution of hydrogen chloride has practically ceased. The reaction mixture is cooled, mixed with water, allowed to settle and the upper (organic) layer is withdrawn and washed with water until it is reasonably free from water-soluble products. The washed organic liquid mass is distilled in vacuo, and the fraction which distills between 145° and 250° at 8 to 12 mm. of mercury pressure is collected as a yellowish liquid.

Part 2: 100 parts of the distilled oil obtained according to Part 1 of this example are treated, with good stirring, at 10° with 120 parts of 7 per cent oleum. The mixture, while being stirred, is then allowed to warm up to 25° to 30°, and that temperature is maintained for 1½ to 2 hours or until a neutralized test portion is soluble in twenty times its weight of water. The sulfonation mixture is then drowned in three times its weight of an ice-water mixture. The resulting solution is neutralized with caustic soda and evaporated to dryness, as in Example 5, Part 2. The product is in the form of light-buff to white flakes. It comprises chiefly a mixture of sulfonates of alkyl naphthalenes and alkali metal sulfate. Its aqueous solutions have good wetting, washing, and parasiticidal properties.

*Example 7.*—Part 1: 300 parts of a chlorinated kerosene mixture of the type produced in the above Examples 1 to 4 is mixed with 30 parts of anhydrous aluminum chloride and 150 parts of commercial diphenyl. The mixture is agitated under reflux at room temperature (that is, at about 15° to 30°) for about one hour and thereafter at about 75° for about one and a half hours. The mass is then cooled to about 20° to 30° and poured into a mixture of 600 parts of ice water and 30 parts of commercial muriatic acid. The aluminum salts dissolve in the cold dilute acid while the organic matter which contains the alkylated diphenyl compounds is precipitated in a semi-liquid, pasty form. Small amounts of benzene and/or ether are added to the agitated aqueous mixture to dissolve the organic products. Upon standing, the mixture separates into an upper layer which is a solution of the organic matter in the organic solvent, and a lower aqueous acid layer which is withdrawn and discarded. The benzol and/or ether solution of organic matter is washed with water until it is reasonably free of acid, and is then distilled in vacuo. The fraction of the distillate which boils at about 170° to about 260° at 5 mm. pressure is collected separately. It is a light-yellow viscous oil which is insoluble in water, but soluble in benzene and in ether. It is a mixture comprised chiefly of alkylated diphenyl compounds in which the alkyl groups correspond with the kerosene hydrocarbons employed. It may also contain some chlor-alkyl diphenyl compounds derived from the dichlor hydrocarbons.

Part 2: 25 parts of the oil obtained according to Part 1 of this example are mixed with 15 parts of 100 per cent sulfuric acid and stirred at about 90° for about 20 minutes, or until a 1 cc. sample is practically completely soluble in about 10 ccs. of water at about 25°. The sulfonation mass is poured into 300 parts of water and the aqueous acid mixture is neutralized with caustic alkali or a water-soluble carbonate (e. g., sodium carbonate), and the resulting neutral solution is dried. The product is chiefly a mixture of the salts (e. g., alkali metal salts) of alkyl-diphenyl sulfonic acids. It is a light-brown to white solid which is soluble in water, and in aqueous solutions of mineral acids and of water-soluble alkalies.

*Example 8.*—560 parts of the mixture of chlorinated hydrocarbons produced in Example 2, 350 parts of phenol and 28 parts of granular anhydrous zinc chloride are agitated at room temperature for about 3 hours and then heated, with agitation, at about 135° for about 5 hours. The resulting reaction mass is cooled and added to about 600 parts of water, the mixture is heated to 70° with agitation, allowed to settle, and the upper, oil layer is separated and washed with hot water to remove zinc chloride and residual phenol. The washed oil is then treated with a small amount of alkali (7 parts of a 50 per cent solution of sodium hydroxide) and distilled in vacuo (e. g., 4 mm. pressure) in a still equipped with a fractionating column. Fractions boiling between about 140° and 230° at 4 mm. pressure are collected as separate products or as one product.

262 parts of one of the resulting mixtures of alkyl phenols (the resulting product or one of the fractions thereof) are sulfonated by agitating well with 262 parts of 100 percent sulfuric acid, while maintaining the temperature at 20° to 30°. When the sulfonation has been effected, the reaction mass is drowned in 1500 parts of water, treated with sufficient caustic soda to render it neutral to Delta paper (about 260 parts of a 50 per cent solution of caustic soda), and evaporated to dryness.

If desired, the crude non-fractionated product which boils above 140° may be sulfonated instead of the fractionated product or products. The resulting sulfonated product is generally somewhat darker in color.

*Example 9.*—Part 1: Chlorine is passed into 400 parts of a kerosene boiling from about 195° to about 300° (over 80 percent of which boils from about 225° to 275°), having a specific gravity of 0.799 at 24°, containing about 5.6 per cent of unsaturated hydrocarbons, and having a probable carbon content ranging mainly from 13 to 16 carbon atoms per molecule, at 50° in diffused sun-light until there is an increase of weight of 111 parts, 2 parts of which is due to dissolved hydrogen chloride. The resulting product comprises unchlorinated hydrocarbon in admixture with mono-, di-, and poly-chlorinated hydrocarbons, the average chlorine content of the mixture being equivalent to about one and one-half atoms of chlorine per molecule of hydrocarbon having the stated carbon content.

Part 2: 150 parts of the chlorinated mixture produced in Part 1 of this example is slowly added to an agitated mixture of 200 parts of phenol and 5 parts of anhydrous zinc chloride at 75°, and the temperature is maintained at 75° for about 30 minutes after all the chlorinated mixture has been added. The temperature of the mixture is then raised and maintained at 135° for 2.5 hours. 5 parts of zinc dust is then added, and after one hour another 5 parts of zinc dust is added, the temperature being maintained during this addition, and for about 3 hours afterward, at 135°. The reaction mixture is cooled, treated with water, and the oil is separated from the water and residual zinc dust and fractionally distilled. The fraction boiling from 140° to 250° at 4 mm. pressure is separately collected. The product, which is an oil showing fluorescence under ultra-violet light, insoluble in water, soluble in alcohol, gasoline, and other organic solvents, is comprised mainly of a mixture of alkyl phenols which may be represented by the general formula:

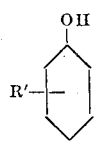

in which R' is a primary, secondary or tertiary alkyl group which for the most part is probably in the para-position to the hydroxyl group.

*Example 10.*—Part 1: A crude chlorinated hydrocarbon mixture is prepared by chlorinating at 50°, in a lead-lined vessel, a kerosene of the type employed in Example 9, until the reaction mixture reaches a specific gravity of 0.91.

Part 2: 150 parts of the product of Part 1 of this example is reacted with 200 parts of phenol as described in Example 9. The crude alkyl phenol product is washed with water and distilled in vacuo. The fraction distilling from 140° to 240° at 3 mm. pressure is separately collected. It comprises a mixture of alkyl phenols in which the alkyl groups correspond with the hydrocarbons of the kerosene, being probably for the main part saturated alkyl hydrocarbon groups.

Part 3: The crude oil obtained in Part 2 of this example is fractionally distilled in vacuo and the distillate boiling from 175° to 225° at 4 mm. pressure is separately collected. To 25 parts of this distillate, under agitation and maintained at a temperature of 30°, there is slowly added 11.6 parts of chlorsulfonic acid. The mixture is agitated for 15 minutes after all of the chlorsulfonic acid has been added. The temperature of the mixture is then raised and held at 70° for 15 minutes. The mixture is then drowned in 250 parts of water, the solution is made neutral to brilliant yellow and Congo red papers by addition of caustic soda thereto, and evaporated to dryness on a double drum drier. The resulting product comprises the sodium salts of a mixture of alkyl phenol sulfonic acids in which the alkyl groups are mainly saturated aliphatic hydrocarbons. It is a light colored to white powder substantially free (less than 4 per cent) of inorganic salts.

Example 11.—10 parts of the alkyl phenol mixture obtained in Example 10, Part 2, are stirred and thereto 10 parts of sulfuric acid monohydrate (100 per cent sulfuric acid) are added slowly so that the temperature of the reaction mixture does not exceed about 30° to 35°. The sulfonation mixture is then warmed to 40° and held at that temperature until a sample is completely soluble in neutral, acid and alkaline water, and/or does not precipitate calcium salts from a calcium chloride solution containing the equivalent of 0.224 gram calcium oxide per liter (30 to 90 minutes). The solution is sometimes slightly turbid due to the presence of insoluble impurities. The sulfonation mass is then diluted with water to about 100 parts by weight and neutralized with sodium or potassium hydroxide, or their equivalents. The neutral solution of sulfonates is filtered and evaporated to dryness.

The final product is a mixture of sodium (or potassium, etc.) salts of alkyl phenol sulfonic acids which in the free state correspond with the general formula

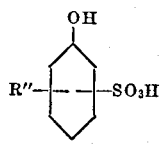

in which $R''$ is a primary, secondary or tertiary alkyl group. The alkyl group is probably para, and the sulfonic acid group is probably ortho to the hydroxyl group.

Example 12.—150 parts of the crude, undistilled chlorinated hydrocarbon product prepared in Example 10, Part 1, 150 parts of phenol, 130 parts of anhydrous zinc chloride and 10 parts of tetrachlorethane are heated under refluxing and agitation at 140° to 150° for about 3½ hours, an additional 10 parts of tetrachlorethane being added after the reaction has proceeded for about 2 hours. The oily reaction mixture is decanted from the zinc chloride, washed with 10 per cent hydrochloric acid and fractionally distilled in vacuo. The portion of the distillate boiling from 180° to 240° at 10 mm. pressure is separately collected. It is similar to the product resulting from the process of Example 10, Part 1, and can be similarly sulfonated to produce a similar sulfonated product.

Example 13.—Part 1: Chlorine is passed into 300 parts of kerosene (boiling from about 210° to about 255°, and for the most part from about 220° to 240°) at 5° to 15° until there is a gain in weight of 58 parts, exclusive of the small amount of dissolved hydrogen chloride present.

Part 2: 150 parts of the resulting chlorinated kerosene, 70 parts of commercial cresylic acid, and 25 parts of anhydrous zinc chloride are agitated vigorously and heated at 135° for 45 minutes. After cooling, the liquid is decanted from the solid material and washed with about 100 parts of 10 per cent hydrochloric acid. The washed oil is vacuum distilled, and the fraction of the distillate boiling between 190° and 240° at 8 mm. pressure is separately collected. It is an amber to white liquid and is comprised chiefly of a mixture of alkyl cresols corresponding with the general formula:

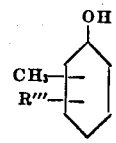

in which $R'''$ is a primary, secondary or tertiary alkyl group.

Part 3: 100 parts of the mixture of alkylated cresols as prepared in Part 2 of this example are agitated rapidly while 128 parts of sulfuric acid monohydrate (100 per cent sulfuric acid) are added with temperature of the sulfonation mixture controlled to remain around 30° throughout the addition. The sulfonation mass is then warmed to 75° and held there until a sample is completely soluble in water and/or does not precipitate calcium salts (about 30 minutes). The sulfonation mass is then diluted, neutralized with caustic soda, filtered and evaporated to dryness. The resulting product is a mixture of alkyl cresol sulfonates.

Example 14.—100 parts of the crude chlorinated hydrocarbon product prepared in Example 9, Part 1, 100 parts of p-cresol and 80 parts of anhydrous zinc chloride are agitated while being heated at 170° in a vessel provided with a reflux condenser. After about 4 hours the heating is discontinued and the mixture is allowed to cool. The oily product is decanted from the zinc chloride, washed with dilute hydrochloric acid and fractionally distilled in vacuo. The portion of the distillate boiling from 190° to 210° at 7 mm. pressure is separately collected. It comprises mainly a mixture of alkyl p-cresols which may be represented by the general formula:

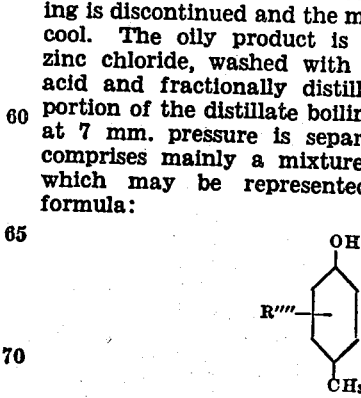

in which $R''''$ is a primary, secondary or tertiary alkyl group, probably mostly in ortho-position to the hydroxyl group, the number of carbon atoms in the alkyl groups represented by R'''' probably being mainly from 13 to 16.

*Example 15.*—100 parts of o-cresol or m-cresol are employed instead of the p-cresol of Example 14. The portion of the resulting m-cresol product boiling from 185° to 205° at 6 mm. pressure, and the portion of the o-cresol product boiling from 160° to 250° at 4 mm. pressure, are separately collected. They respectively comprise mainly a mixture of alkyl m-cresols and alkyl o-cresols, and can be sulfonated in the manner herein described to produce corresponding alkyl cresol sulfonates.

*Example 16.*—Part 1: 150 parts of the chlorinated kerosene of Example 13, Part 1, 80 parts of o-chlorophenol and 40 parts of anhydrous zinc chloride are agitated vigorously and heated at 135° for 45 minutes. The liquid is decanted from the solid and washed once with about 100 parts of 10 per cent hydrochloric acid. The oil is vacuum distilled. The fraction boiling between 180° and 250° at 8 mm. pressure is collected separately. It is a brown to white liquid comprised chiefly of a mixture of alkyl o-chlorophenols corresponding with the general formula

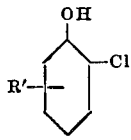

in which R' has the meaning above given in Example 9.

Part 2: The mixture of alkylated o-chlorophenols obtained in Part 1 of this example is sulfonated and isolated in the manner described in Example 13, Part 2. The resulting product comprises a mixture of alkyl chlorophenol sulfonates having properties similar to those of the other alkyl phenol sulfonates herein described.

*Example 17.*—150 parts of the chlorinated kerosene of Example 13, Part 1, 90 parts of salicylic acid and 50 parts of anhydrous zinc chloride are agitated vigorously and heated at 140° to 150° for 4 hours. When the reaction mixture cools to 80°, 100 parts of water are added, and then about 70 parts of ether. The zinc chloride is removed by washing several times with water. The ether solution is extracted with sodium carbonate solution. The sodium carbonate solution is boiled to remove any dissolved ether, acidified with hydrochloric acid and heated. The excess salicylic acid dissolves and leaves the alkyl salicylic acid as an oil. The crude alkylated salicylic acid when cold is a brown, gummy solid. It forms a good detergent with alkali.

*Example 18.*—Part 1: A chlorinated kerosene mixture of the type produced in Examples 1 to 4 is produced by fractionally distilling a crude chlorinated kerosene prepared as described in Example 1, from a kerosene containing mainly hydrocarbons having 13 to 15 carbon atoms per molecule, and separately collecting the fraction boiling from 120° to 160° at 8 mm. pressure. 200 parts of this fraction are mixed with 150 parts of 8-hydroxyquinoline, and to this mixture, with agitation, there are slowly and cautiously added 150 parts of anhydrous aluminum chloride. 50 parts of tetrachlorethane are added, and the mixture carefully heated. A vigorous reaction develops which is controlled, if necessary, by cooling same. After the reaction has moderated, the reaction mass is maintained at a temperature of 90° for 3 hours, the mixture poured on to ice, acidified with hydrochloric acid, and the oil which separates is washed with dilute caustic soda solution and distilled. The fraction which distills over at 200° to 230° at 3 mm. pressure is separately collected. The product thus obtained comprises a mixture of alkylated hydroxyquinolines having the following general formula:

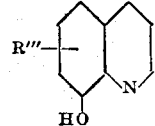

wherein R''' is a primary, secondary or tertiary alkyl group, said alkyl groups containing mainly 13 to 15 carbon atoms.

Part 2: 10 parts of the mixture of alkyl hydroxy quinolines prepared according to Part 1 of this example are treated with 60 parts of sulfuric acid monohydrate at 50° for 15 to 20 minutes, the reaction mass drowned in 300 parts of cold water, the solution is made neutral to Brom Cresol Green paper by addition thereto of caustic soda, and evaporated to dryness. The resulting product comprises a mixture of the sodium salts of the alkyl hydroxy quinoline sulfonic acids. It may be purified by extraction with alcohol, filtering, and evaporating the alcoholic solution to dryness. The product has detergent and insecticidal properties.

*Example 19.*—Part 1: A mixture of 300 parts of the chlorinated hydrocarbon prepared in Example 10, Part 1, 200 parts parahydroxydiphenyl and 35 parts of anhydrous zinc chloride is heated under a reflux condenser to refluxing temperature, with agitation, for 7 hours. The mixture is cooled, a sufficient amount of ether and alcohol (equal parts) is added to dissolve the solid organic material which is present, and the alcohol-ether solution is washed with water and distilled in vacuo. The portion boiling from 230° to 300° at 5 mm. pressure is separately collected. It is comprised of a mixture of alkyl p-hydroxydiphenyls.

Part 2: To 25 parts of the mixture of alkyl p-hydroxydiphenyls prepared in Part 1 of this example there is slowly added 27 parts of sulfuric acid monohydrate. The mixture is agitated at 75° for about 25 minutes, cooled, poured into water, and the aqueous solution is made neutral to Brom Cresol Green paper by addition of caustic soda thereto and then evaporated to dryness. The resulting product comprises a mixture of the sodium salts of alkyl p-hydroxydiphenyl sulfonic acids in which the alkyl groups correspond with the hydrocarbons of the kerosene employed.

*Example 20.*—Part 1: A mixture of 200 parts of the chlorinated hydrocarbon product prepared in Example 10, Part 1, 150 parts beta-naphthol, and 100 parts of anhydrous zinc chloride is stirred and heated to 180° for 5 hours. The reaction mass is cooled, extracted with ether, and the ether extract is washed with water and then distilled under reduced pressure. The product boiling from 145° to 280° at 3 mm. pressure is separately collected. It comprises a mixture of alkyl beta-naphthols.

Part 2: 25 parts of the mixture of alkyl beta-naphthols prepared as described in Part 1 of this example are heated with 33 parts of sulfuric acid monohydrate at 95° for 2 hours. The resulting mass is drowned in 300 parts of water, and the solution is made neutral to Brom Cresol Green paper by addition thereto of caustic soda. The neutralized solution is dried on a double drum drier. The resulting product comprises a mixture of alkyl beta-naphthol sulfonic acids in the form of the sodium salts. It is soluble in water, and has the properties of a detergent and dispersing agent.

Example 21.—420 parts of bromine dissolved in 1600 parts of carbon tetrachloride are slowly added in small portions at a time to 500 parts of a kerosene of the type employed in Examples 1 to 4 contained in a glass vessel, at ordinary temperature in the presence of actinic light from a mercury lamp. The resulting crude product, after distilling off the carbon tetrachloride, comprises a mixture of brominated hydrocarbons. 108 parts of this crude product is mixed with 75 parts of phenol and 10 parts of anhydrous zinc chloride, and the mixture is heated at 135° for 4 hours. The resulting mass is cooled, washed with water, and distilled under reduced pressure. The fraction distilling between 140° and 205° at 4 mm. pressure is separately collected. It comprises a mixture of alkyl phenols similar to those produced with the aid of chlorine.

Example 22.—Part 1: 200 parts of a crude chlorinated kerosene mixture of the type produced in the above Examples 1 to 4, 105 parts phenetol (boiling from 167° to 172° at atmospheric pressure) and 20 parts anhydrous zinc chloride are mixed in a suitable vessel fitted with a reflux condenser and agitator. The agitated mixture is heated slowly to a temperature between 100° and 110°, and maintained there for about 17 hours. The reaction mixture is then cooled, the liquid portion is decanted, mixed and washed with approximately 100 parts of a 10 per cent aqueous solution of muriatic acid. The oil is separated from the aqueous layer and distilled in vacuo. The portion of the distillate boiling from 135° to 205° at 5 mm. (mercury) pressure is collected as a yellow, mobile, oil which is insoluble in water, dilute caustic soda and acid. It is completely and readily soluble in ethyl ether, benzene, carbon tetrachloride, ethylene dichloride, etc. Its solubility in alcohol is much less than in the foregoing solvents. The oil is a mixture of C-alkyl phenetols and some C-alkyl phenols, the major portion of the mixture being the C-alkyl phenetols in which the nuclear substituent groups are hydrocarbon residues which correspond with the hydrocarbons from which the chlorinated kerosene is derived.

Part 2: 15 parts of the distilled mixture of alkylated phenetol of Part 1 of this example are cooled to a temperature between 0° and 5° and while the mixture is rapidly agitated, 28 parts of sulfuric acid monohydrate are added slowly to it. During the acid addition the temperature of the sulfonation mass is maintained below 15°. This mixture is agitated at room temperature for about 1 hour until a sample is completely soluble when neutralized with caustic soda in about 20 to 25 times the sample's weight of water. The mass is then diluted with about 100 parts of ice and water, carefully neutralized to faint alkalinity with aqueous caustic soda, and the neutral solution is evaporated to dryness. The product is chiefly a mixture containing the sodium sulfonates of mixed alkyl phenetols in which the alkyl groups are alkyl hydrocarbon radicals corresponding with the alkyl chlorides from which they are derived. The product is a pale-brown to white friable but granular solid which is easily soluble in water and forms solutions which foam readily. The product is soluble in alkaline, neutral or acid aqueous solutions made from hard or soft water, and does not precipitate any alkaline earth salts from its solutions in hard water. The aqueous solutions are characterized by their excellent emulsifying, dispersing, wetting and detergent powers.

The sodium sulfonates of the alkylated phenetols in the mixture can be extracted with alcohol in which they are soluble; and thereby freed from inorganic salts. They are also soluble to an appreciable extent in toluene, benzene and naphtha.

Another and preferred method of making the alkylated aryl-alkyl ethers of this invention consists of two reactions. By means of the first reaction a phenolic body is nuclearly alkylated to form a C-alkyl phenol mixture as described above; by means of the second reaction the hydroxyl groups of the C-alkyl phenols are etherified. The following example illustrates this method:

Example 23.—Part 1: 75 parts of a mixture of nuclearly alkylated cresylic acids of the type produced in Example 13, Part 2, 50 parts of denatured alcohol, and 23 parts of a 50% aqueous caustic soda solution are mixed in a vessel fitted with an agitator and a reflux condenser. The mixture is heated gently to its boiling point, and maintained at the temperature at which the mixture refluxed gently throughout the subsequent etherification reaction. 40 parts of diethyl sulfate are added as a continual but fine stream over a period of about 30 minutes. Refluxing of the mixture is continued for about 1 to 1.5 hours after the last of the diethyl sulfate is added. The mixture is then cooled by addition of about 200 parts water, and after further agitation for about 30 minutes is filtered. The filtrate on standing separates by gravity, and the remaining upper layer of oil is distilled in vacuo. The fraction of the distillate which distills between 140° at 3 mm. and 205° at 3 mm. is collected separately and comprises a mixture of nuclearly alkylated cresylic acid ethyl ethers. The mixture is a pale yellow, refractive, mobile oil which is insoluble in water or caustic soda. It dissolves in most organic solvents, such as ethyl ether, carbon tetrachloride, ethylene dichloride and benzene. It is much less soluble in alcohol than in the aforementioned solvents. The major portion of the material is a mixture of C-alkyl cresyl ethers.

Part 2: 15 parts of the distilled mixture of nuclearly alkylated cresyl ethyl ethers of Part 1 of this example are agitated rapidly in a suitable vessel, cooled to about 0° and treated with small additions of 6 parts of chlorsulfonic acid (about 110 per cent to 115 per cent of amount theoretically required for monosulfonation). The temperature of the sulfonation mixture is not permitted to exceed 15° during the addition of acid. The mixture is stirred for about 2 hours until a sample is completely soluble when neutralized with caustic soda in about 20 to 25 times the sample's weight of water. The sulfonation mass is then drowned in water, neutralized with caustic soda and evaporated to dryness.

The dry product comprises chiefly a mixture of sodium sulfonates of C-alkyl cresyl ethyl ethers in which the alkyl groups correspond with the alkyl halides of the chlorinated kerosene. It is a pale yellow, friable solid, which dissolves readily in water to a faintly yellow solution having excellent detergent, wetting and dispersing properties.

In a similar manner other mixtures of alkylated alkoxy-aromatic compounds containing 1 to 8 carbon atoms in the alkoxy radical (which may be an aralkoxy radical) can be produced from the corresponding alkoxy-aromatic compounds, or from the mixed alkyl hydroxy-aromatic compounds herein described and alkylating agents containing 1 to 8 carbon atoms in the alkyl group.

*Example 24.*—Part 1: 42 parts of mixed acid which contains about 29 per cent nitric acid and about 57 per cent sulfuric acid, are added very slowly to 50 parts of the mixture of alkylated benzene prepared according to above Example 5, Part 1. The rapidly agitated mass is maintained at a temperature below 30° throughout the period of addition of mixed acid, and for about 30 minutes after the addition is complete. The nitrated mass is then diluted with about an equal volume of water and allowed to stand. The mixture of nitrated alkylated benzene separates as an oily upper layer which is removed from the lower layer of aqueous acid. It is washed with water until reasonably free of acid, then with a dilute solution of alkali and finally with water until practically neutral. The oil thus obtained has a light red to brown color. It is a mixture of alkyl nitro benzenes, and most probably contains only mononitro compounds.

Part 2: A mixture of 30 parts of water, 60 parts of 60 mesh iron dust and 5 parts of commercial muriatic acid is heated to about 90° and thereto 51 parts of the mixture of alkyl nitrobenzene of Part 1 of this example are added slowly and incorporated in the reducing mixture by vigorous agitation. The whole reacting mass is heated and maintained at its refluxing temperature until reduction is complete. Completion of the reduction is ascertained by extracting a sample of the reaction mass with benzene, and pouring the benzene solution over a clean piece of white filter paper. The reduction is finished if the spot on the paper after the benzene has evaporated is free from yellow coloration. The reduced mixture is neutralized with alkali, the liquid portion of the reduction mixture is removed from the solids, and allowed to settle. The product separates as an oily layer above the aqueous mixture. It is removed and after being washed with water several times it is dried and distilled. The fraction which distills from about 140° to about 225° at 7 mm. of mercury pressure is collected as an amber-yellow oil, which is only very slightly soluble in water. It is a mixture of C-alkyl anilines.

Part 3: 25 parts of 26 per cent oleum are added very slowly to a vigorously agitated and cooled charge of 25 parts of the mixture of C-alkyl anilines of Part 2 of this example. The temperature of the mixture during addition of the oleum is not allowed to exceed 40°. Thereafter, the mixture is heated to about 70° and is held there until a sample is clearly soluble in water. Usually, the sulfonation is considered sufficient when 1 cc. of the sulfonated mixture is clearly soluble in about 10 cc. of water at 25°. The sulfonation mixture is poured into about 300 parts of water; the aqueous mixture is neutralized with caustic soda or sodium carbonate and the solution is evaporated to dryness. The dry product consists of a mixture of C-alkyl aniline sodium sulfonates together with sodium sulfate. It is an excellent detergent and soap substitute.

*Example 25.*—Part 1: In a reactor which is fitted with an agitator and a reflux condenser, a vigorously agitated mixture of 200 parts of a crude chlorinated kerosene mixture of the type produced in the above Examples 1 to 4, 100 parts benzoic acid and 35 parts anhydrous zinc chloride is maintained at a temperature of about 135° until evolution of hydrogen chloride gas from the mixture practically ceases and thereafter for a further period of about 2 to 3 hours. The total heating period is about 6 hours. The agitated mixture is cooled, and at about 75° it is diluted with about 150 to about 200 parts of denatured alcohol. The mixture is cooled further to about 20° and is again diluted first with about 150 parts of commercial ether, for the purpose of dissolving organic products, and second with a 10 per cent aqueous solution of hydrochloric acid for the purpose of dissolving inorganic bodies. The mixture is allowed to stand and to separate into two layers, the lower of which consists of an aqueous extract which is withdrawn and discarded. The residual upper layer, which is substantially a solution in the organic solvent of the organic products in the condensed mass, is washed with cold or tepid water until it is reasonably free of acid and water soluble products. It is then fractionally distilled in vacuo. The fraction which distills between about 160° and about 260° at 4 mm. pressure is separately collected. It is a viscous liquid which is partially soluble in aqueous caustic soda solution.

Part 2: 25 parts of the distilled mixture of alkyl derivatives of benzoic acid of Part 1 of this example are rapidly agitated and mixed slowly with 18 parts of 100 per cent sulfuric acid while the temperature of the agitated mixture is permitted to rise to about 50°. Then 20 parts of 26 per cent oleum are added slowly and the temperature of the mixture is maintained between about 60° and about 70°. The mixture is agitated at this temperature until the sulfonated products possess the desired solubility in aqueous solutions. (The sulfonation is usually considered to be sufficient when about 1 cc. of the mixture is practically completely soluble in about 10 cc. of water at about 25°. This solubility is usually attained at the end of about 1.5 hours of agitation following the addition of the oleum.) The mixture is drowned with about 300 parts of water, the aqueous mixture is neutralized with caustic soda, and the neutral solution of the mixture of sodium sulfonates of alkyl derivatives of benzoic acid is evaporated to dryness. The dry mixture containing sodium sulfonates of alkyl derivatives of benzoic acid is a light-brown to white friable solid which is readily soluble in water. Its aqueous solutions foam strongly and have excellent wetting, penetrating and detersive powers.

*Example 26.*—Part 1: A kerosene fraction of Pennsylvania petroleum boiling from 185° to 280° is fractionated and a fraction is collected between 91° at 13 mm. pressure and 109° at 12 mm. pressure. The collected fraction boils from 200° to 235° at atmospheric pressure and 90 per cent of it boils between 212.5° and 231°. Chlorine is passed into 340 parts of the resulting fraction maintained below 60°, in the presence of light, until there is an increase in weight of 88 parts.

Part 2: 150 parts of the mixture produced in Part 1 of this example are added with agitation, to a mixture of 80 parts of benzene and 4 parts of anhydrous aluminum chloride at ordinary temperature. The addition is made as rapidly as possible. The mixture is agitated for one hour and then allowed to separate. The resulting condensation product is decanted from the aluminum chloride sludge and washed with water, and the washed material is stripped of unreacted materials by distilling. The portion boiling up to 118° at 10 mm. and containing residual benzene is separated from the remainder which comprises a mixture of alkyl benzene and residual kerosene. It is similar in properties to the product of Example 5, Part 1.

Part 3 75 parts of the alkyl benzene product of Part 1 of this example is sulfonated with 1¼ times its weight of 26 per cent oleum. The oleum is added thereto at 10 to 15°, and the mixture is then agitated at room temperature for about 2 hours. The sulfonation mixture is diluted with four times its weight of an ice-water mixture and neutralized with caustic alkali (e. g., sodium hydroxide) to a pH of 7.0 to 8.0. The neutral solution is evaporated to dryness on an atmospheric double drum drier.

The mixtures of sulfonates as obtained in the above examples are light-brown to white friable solids. They are very soluble in water producing solutions which foam readily. They do not precipitate calcium salts from hard water, although a slight turbidity may be present. They have detergent properties, and in general are excellent wetting and dispersing agents. While crude alkyl aromatic mixtures may be sulfonated either before or after the separation of residual aromatic compound and/or aliphatic hydrocarbon from the mixture, the use of purified alkyl aromatic compounds is preferred since they give sulfonation products having superior detergent properties.

It will be realized by those skilled in the art that changes may be made in the products, and in the processes of preparing and using them, hereinbefore described, without departing from the scope of the invention.

Thus, the mixed alkyl aromatic sulfonates may be prepared in various ways from various aliphatic hydrocarbons having the characteristics herein set out, and especially suitable fractions of petroleum distillates. As above pointed out, the more important sources of raw material for preparation of the alkyl aromatic compounds employed as intermediate products for the production of the sulfonated products are the kerosene fractions derived from paraffinic petroleums; as far example, those obtained from Pennsylvania, Michigan, Texas, and Oklahoma petroleums, those obtained from Pennsylvania petroleum and from Mt. Pleasant, Michigan, petroleum being especially preferred.

The chlorination of the petroleum hydrocarbon may be carried out by any well known process. The approximate extent of chlorination may be determined by the increase in the weight of the hydrocarbon material chlorinated or by the increase of the specific gravity of the mixture.

In general, the extent of chlorination of the petroleum hydrocarbon may be regulated by a weight increase corresponding to a product containing a ratio of about one-fourth to 2.5 atoms of chlorine per molecule of hydrocarbon, about 1.1 to 1.5 atoms being preferred, but it will be understood that other ratios may be used. Ordinarily, the greater the amount or extent of chlorination, the greater is the amount of high boiling residues obtained. In general, the monochloride boils about 15° to 20° higher than the petroleum distillate from which it is derived. If desired, the chlorinated products may be frictionally distilled so as to obtain a further selection and restriction of alkyl compounds having a selected content of chlorine atoms. Instead of chlorine, other halogens may also be employed in effecting halogenation; e. g., bromine, etc.

Various chlorination temperatures may be employed, for example temperatures within the range 0° to 70°, and preferably in the neighborhood of 50°. The chlorination may be carried out with the aid of chlorine carriers, catalysts or adjuvants; as for example, phosphorus trichloride, iodine, sunlight, etc. Chlorination in the presence of light is preferred.

The condensation of the halogenated hydrocarbon with the aromatic compound may be carried out with the aid of various condensing agents; as for example metals (such as, zinc or iron), metal halides (such as, anhydrous aluminum chloride, anhydrous zinc chloride, anhydrous ferric chloride). The proportion of mixed alkyl halides employed with respect to the aromatic compound in the preparation of the alkylated aromatic compounds may be varied. Preferably the proportion of mixed halogenated hydrocarbons employed with respect to the aromatic compound is such that only one alkyl radical of the type represented by R above is contained in the resulting alkyl aromatic compounds. Thus, at least 1.25 mols of aromatic compound per mol of mixed halogenated hydrocarbons is preferably employed in the condensation. A molar ratio as low as 1 to 1 may be employed, but the yield of the resulting mixed alkyl aromatic compounds containing one long alkyl group will be less.

The amount of condensing agent employed may vary over a wide range. For example, in using anhydrous metal chlorides as the condensing agent, in some cases as low as 1 per cent and in others about 5 to 20 per cent or more by weight of anhydrous metal chloride, based upon the amount of halogenated petroleum hydrocarbon, may be employed. The condensation reaction may be carried out at various temperatures as is evident from the above examples.

Mixtures of aromatic compounds may be employed as reacting ingredients, if desired; as, for example, naturally occurring mixtures such as commercial cresylic acid, or artificially prepared mixtures of two or more of the aromatic compounds.

The alkyl aromatic compounds may be purified by fractional or steam distillation, or by other suitable processes. Purification is not essential, but it is to be noted, by the employment of mixtures of alkyl aromatic compounds which have been purified by fractional vacuum distillation, products having superior detergent properties are obtained as compared to those produced when a relatively less pure mixture of alkyl aromatic compounds is sulfonated.

The sulfonation of the mixture of alkyl aromatic compounds may be carried out with any suitable agent; as, for example, sulfuric acids of various strengths (66° Bé., 100 percent, 26 per cent oleum, 65 per cent oleum, etc.), chlorsulfonic acid, etc. As appears from the foregoing examples, the sulfonation may be carried out in the presence of inert solvents or diluents, as for example, the halogenated aliphatic or aromatic hydrocarbons (carbon tetrachloride, tetrachlorethane, ethylene dichloride, dichlorbenzene, etc.) or sulfonation may be carried out in their absence. When an inert solvent or diluent is used, it may be separated mechanically or by evaporation from the alkaline aqueous solution of the sulfonic acid salts of the alkyl aromatic compounds which results upon diluting the sulfonation mass with water and adding an alkali. If desired sulfonation assistants may be employed; as for example the lower fatty acids and their anhydrides (e. g., acetic acid, acetic anhydride, etc.) or the alkali metal sulfates (e. g., sodium or potassium sulfate, etc.).

The temperature at which the sulfonation is carried out may vary within wide limits. For example, temperatures as low as about 0° and as high as about 140° may be employed. In general the more vigorous the sulfonation agent the lower is the preferred temperature. Preferred sulfonation temperatures lie between about 15° and about 90°. Ordinarily the completion of the sulfonation is carried out at a temperature of about 35° to about 80°. In using sulfuric acid monohydrates as the sulfonating agent, a temperature of about 30° to 70° is preferred.

The ratio of sulfonating agent employed with respect to the mixture of alkyl aromatic compounds also may be varied. Thus, for complete sulfonation, the sulfonating agent in terms of 100 per cent sulfuric acid may range from 0.3 to 5 times or more the weight of the alkyl aromatic compounds to be sulfonated. The extent to which the sulfonation is carried out may vary with the individual material being sulfonated, the duration or time of sulfonation, and the use to be made of the sulfonated product. In some cases, a degree of sulfonation which corresponds with a product having maximum detergent properties is not completely soluble in water to form a clear solution and/or may cause some precipitation of lime salts. On the other hand, a product which causes no precipitation of lime salts may not have maximum obtainable detergent properties because of excessive sulfonation. Furthermore, in some cases the degree of sulfonation may not be the same for products to be used as detergents in soft water, in hard water and in alkaline solutions. (As a standard of comparison, an aqueous solution of calcium chloride equivalent to 0.224 grams calcium oxide per liter of solution is employed as a standard hard water.) For use of the products in accordance with the present invention, a degree of sulfonation corresponding with maximum detergent action (approximately monosulfonation) is preferred.

The sulfonated products may be employed in the form of their free sulfonic acids or in the form of salts. They are preferably employed in accordance with the present invention in the form of salts of the alkali metals. The salts may be obtained in any suitable manner; for example, by reacting the sulfonated product with a metal oxide or hydroxide, ammonia or an organic base, or of a suitable salt of one of these, in an amount adapted to form a neutral product. Among the bases, oxides and salts which may be combined with the sulfonated products to produce salts useful as detergents in accordance with the present invention, are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; diamino propanol; ethylene diamine; triethylene tetramine; aniline; o-toluidine; etc.

The reaction mixtures resulting from the sulfonation of the mixed alkyl aromatic compounds may also be directly employed for the formation of mixed products, as for example, mixtures of salts of the alkyl aromatic sulfonic acids and other acids present in said reaction mixtures, which mixtures of salts are also useful as detergents in accordance with the present invention. Thus, the sulfonation reaction mixture resulting from the treatment of the mixed alkyl aromatic compounds with an amount of sulfonating agent in excess of that theoretically required to effect the desired degree of sulfonation may be treated with a suitable inorganic or organic base or basic salt (as for example, one of those mentioned) and the resulting mixture of the salt of the sulfonated alkyl aromatic compounds and the inorganic salt (as for example, sodium sulfate) may be jointly isolated from the reaction mixture and employed as such. If it is desired to produce salts of the sulfonated alkyl aromatic compounds in a form substantially free from inorganic salts (for example, inorganic sulfates) this may be accomplished by taking advantage of their greater solubility than the inorganic salts in alcohol and other organic solvents, or by using an amount of chlorsulfonic acid such that no excess, or only a relatively small excess, of same is present in the final sulfonation mass or mixture.

The sulfonated products in the form of metallic salts or salts of inorganic bases are usually yellowish to white, friable solids; and in the form of salts of organic bases vary from viscous oils to semi-solids to solids. In general, the salts are readily soluble in water and in neutral, acid or alkaline aqueous solutions to form solutions which are colorless or faintly colored brown or yellow, which are of a soapy nature, and foam readily. Certain of the salts, such as the impure salts of organic polyamines, are oils which generally are insoluble in water but soluble in organic solvents (as for example, alcohol, benzene, gasoline, etc.), in which they exert detergent action, and in aqueous solutions of alkalies (presumably by conversion to the salts of the alkalies).

The sulfonated products may be dried in any suitable manner; they are preferably dried on atmospheric or vacuum drum driers or in spray driers. Preferably the sulfonates derived from organic bases are dried under vacuum conditions.

The said sulfonation products may be used in powder or in paste form, or in solution, as wetting, dispersing or emulsifying agents instead of the usual soaps, and/or for scouring, cleaning, washing, toilet and other purposes for which ordinary soaps have heretofore been employed, with or without the presence of, or admixture with, abrasive material, e. g., whiting, pumice, etc. They also may be employed in conjunction, or in admixture, with an ordinary soap (a higher fatty acid salt), as disclosed and claimed in my copending application Serial No. 403,235, filed July 19, 1941; since it has been found that the sulfonation products of the present invention, when jointly present with an ordinary soap, prevent or hinder formation of objectionable precipitates which are otherwise produced by soap when used in hard water or in acid or salt baths. The sulfonation products of the present invention have the further advantage of being, in general, better wetting agents, of being more readily soluble in water and various organic solvents than the usual soaps, and of leaving goods washed therewith with a soft feel. Inasmuch as water solutions of said sulfonation products in the form of their alkali metal salts are neutral in reaction, they may be safely used for the washing of delicate silks and other fine fabrics, as well as for personal toilet purposes.

In addition to their usefulness as detergents as herein disclosed, the mixed alkyl aromatic sulfonates may be employed either in the form of the free acids or their metal, ammonium or organic ammonium salts as wetting, impregnating, dispersing, assisting, penetrating, insecticidal and fungicidal agents.

It is to be noted that mixtures of two or more of the sulfonated products hereinbefore referred to may be employed. Furthermore, any of the said sulfonated products or their mixtures may be employed in connection with other hydrotropic substances; dispersing, emulsifying and/or penetrating agents; aliphatic or aromatic sulfonic acids; acid alkyl esters of sulfuric acid; sulfonation products of petroleum oil; alkyl aryl sulfonates free from a nuclear hydroxyl group; and/or their derivatives.

I claim:

1. A mixture of alkyl derivatives of an aromatic sulfonate of which the alkyl groups correspond with the hydrocarbons of an aliphatic hydrocarbon mixture at least 80 per cent of which boils between 210° and 320° C. and over a maximum range of 55° C., and obtainable by a process comprising halogenation of the aliphatic hydrocarbon mixture to form mixed alkyl halides, and condensation of resulting mixed alkyl halides with an aromatic compound followed by sulfonation.

2. A mixture of alkyl derivatives of an aromatic sulfonate of which the alkyl groups correspond with the aliphatic hydrocarbons of a petroleum distillate of which at least 80 per cent boils between 210° and 320° C. and over a maximum range of 55° C., and obtainable by a process comprising chlorinating said petroleum distillate, to form mixed alkyl chlorides, and condensing resulting mixed alkyl chlorides with an aromatic compound followed by sulfonation.

3. A mixture of alkyl derivatives of an aromatic sulfonate of the benzene series of which the alkyl groups correspond with the aliphatic hydrocarbons of a petroleum distillate of which at least 80 per cent boils between 210° and 320° and over a maximum range of 55° C., and obtainable by a process comprising chlorinating said petroleum distillate, to form mixed alkyl chlorides, and condensing resulting mixed alkyl chlorides with an aromatic compound of the benzene series followed by sulfonation.

4. A mixture of alkyl derivatives of an aromatic sulfonate the alkyl groups of which contain between 12 and 19 carbon atoms and are derived from mixed alkyl chlorides resulting from chlorination of a petroleum distillate of which at least 80 per cent boils between 210° and 320° C. and over a maximum range of 55° C.

5. A mixture of monoalkyl derivatives of an aromatic sulfonate of which the alkyl groups are derived from a halogenated Pennsylvania petroleum distillate at least 80 per cent of which petroleum distillate boils between 210° and 320° C. and over a maximum range of 30° C.

6. A mixture of monoalkyl derivatives of an aromatic sulfonate of which the alkyl groups are derived from a mixture of alkyl chlorides resulting from chlorination of a mixture of aliphatic hydrocarbons of the type of Pennsylvania petroleum distillate boiling between 210° and 290° C. of which at least 80 per cent boils over a maximum range of 55° C.

7. A mixture of monoalkyl derivatives of a phenyl sulfonate of which the alkyl groups are derived from a petroleum distillate of which at least 80 per cent boils between 210° and 320° C. and over a maximum range of 55° C.

8. A mixture of monoalkyl derivatives of a phenyl sulfonate of which the alkyl groups contain 12 to 19 carbon atoms and are derived from a chlorinated Pennsylvania petroleum distillate, at least 80 per cent of which petroleum distillate boils between 210° and 320° C. and over a maximum range of 30° C.

9. A method of making a sulfonated product, which comprises halogenating an aliphatic hydrocarbon mixture at least 80 per cent of which boils between 210° and 320° C. and over a maximum range of 55° C., to form a mixture of alkyl halides, condensing resulting mixed alkyl halides with an aromatic compound, and then sulfonating.

10. A method of making a sulfonated product, which comprises halogenating a petroleum distillate at least 80 per cent of which boils between 210° and 320° C. and over a maximum range of 55° C., to form a mixture of alkyl halides, condensing resulting mixed alkyl halides with an aromatic compound to produce a mixture of alkyl derivatives of said aromatic compound, and sulfonating a mixture of said alkyl derivatives.

11. A method of making a sulfonated product, which comprises halogenating a petroleum distillate of which 80 per cent consists of aliphatic hydrocarbons containing between 12 and 19 carbon atoms per molecule and boiling between 210° and 320° C. and over a maximum range of 55° C., to produce a mixture of alkyl halides, condensing resulting mixed alkyl halides with an aromatic compound to produce a mixture of alkyl derivatives of said aromatic compound, and sulfonating a mixture of said alkyl derivatives.

12. A method of making a sulfonated product, which comprises reacting chlorine with a petroleum distillate of which 80 per cent consists of aliphatic hydrocarbons containing between 12 and 19 carbon atoms per molecule and boiling between 210° and 320° C. and over a maximum range of 55° C., to produce a mixture of alkyl chlorides, condensing resulting mixed alkyl chlorides with an aromatic compound to produce a mixture of alkyl derivatives of said aromatic compound, and sulfonating a mixture of said alkyl derivatives.

13. A method of making a sulfonated product, which comprises chlorinating a mixture of aliphatic hydrocarbons of the type of Pennsylvania petroleum distillate at least 80 per cent of which boils between 210° and 320° C. and over a maximum range of 55° C., carrying out the chlorination under conditions resulting in a product containing a ratio of about 1.1 to 1.5 atoms of chlorine per molecule of hydrocarbon, condensing the resulting mixture of alkyl chlorides with an aromatic compound of the benzene series with the aid of a metal halide condensing agent, and sulfonating a resulting mixture of alkyl derivatives of the aromatic compound.

14. A method of making a sulfonated product, which comprises chlorinating a Pennsylvania petroleum distillate boiling between 210° and 290° C. of which at least 80 per cent boils over a maximum range of 55° C., carrying out the chlorination under conditions resulting mainly in the formation of alkyl monochlorides, condensing the resulting mixture of alkyl monochlorides with an aromatic compound of the benzene series with the aid of a metal halide condensing agent, and sulfonating a resulting mixture of alkyl derivatives of the aromatic compound.

15. A method of making a sulfonated product, which comprises chlorinating a petroleum distillate of the type of Pennsylvania petroleum distillate of which at least 80 per cent boils between 210° and 265° C. to produce a mixture of alkyl chlorides, condensing resulting mixed alkyl chlorides with an aromatic hydrocarbon of the benzene series to produce a mixture of alkyl derivatives of said aromatic hydrocarbon, and sulfonating a mixture of said alkyl derivatives.

16. A method of making a sulfonated product, which comprises chlorinating a petroleum distillate of the type of Pennsylvania petroleum distillate of which at least 80 per cent boils between 210° and 265° C. to produce a mixture of alkyl chlorides, condensing resulting mixed alkyl chlorides with benzene to produce a mixture of alkyl derivatives of benzene, and sulfonating a mixture of said alkyl derivatives.

17. A mixture of alkyl derivatives of an aromatic sulfonate of which the alkyl groups are derived from an aliphatic hydrocarbon mixture of which at least 80 per cent boils between 210° and 265° C.

18. A mixture of monoalkyl derivatives of an aromatic monosulfonate of the benzene series of which the alkyl groups are derived from a petroleum hydrocarbon mixture of which at least 80 per cent boils between 210° and 265° C., and obtained by a process comprising chlorinating said petroleum hydrocarbon mixture to form mixed alkyl chlorides, condensing resulting mixed alkyl chlorides with an aromatic hydrocarbon of the benzene series to produce a mixture of alkyl derivatives of said aromatic hydrocarbon, and sulfonating a mixture of said alkyl derivatives.

19. A mixture of monoalkyl derivatives of phenyl monosulfonate of which the alkyl groups are derived from a paraffinic petroleum kerosene 80 per cent of which kerosene boils within the range 210° to 265° C.

20. A method of making a sulfonated product, which comprises chlorinating a kerosene derived from a paraffinic petroleum at least 80 per cent of which kerosene boils within the range 210° to 265° C., condensing mixed alkyl chlorides resulting from the chlorination with an aromatic compound to produce a mixture of alkyl derivatives of said aromatic compound, and sulfonating a mixture of said alkyl derivatives.

21. A method of making a sulfonated product, which comprises chlorinating a mixture of aliphatic hydrocarbons of the type of Pennsylvania petroleum distillate at least 80 per cent of which boils between 210° and 320° C. and over a maximum range of 55° C., carrying out the chlorination under conditions resulting in a product containing a ratio of about 1.1 to 1.5 atoms of chlorine per molecule of hydrocarbon, condensing the resulting mixture of alkyl chlorides with an aromatic compound of the benzene series with the aid of aluminum chloride as a condensing agent, the amount of aromatic compound of the benzene series employed in the condensation being at least 1.25 mols per mol of the mixture of alkyl chlorides, and sulfonating a resulting mixture of alkyl derivatives of the aromatic compound.

22. A mixture of monoalkyl derivatives of an alkoxy-aromatic sulfonate of which the alkyl groups are derived from a petroleum distillate of which at least 80 per cent boils between 210° and 320° C. and over a maximum range of 55° C., the alkoxy group of the alkoxy-aromatic sulfonate containing 1 to 8 carbon atoms.

23. A mixture of monoalkyl derivatives of a phenetol sulfonate of which the alkyl groups are derived from a petroleum distillate of which at least 80 per cent boils between 210° and 320° C. and over a maximum range of 55° C.

24. A mixture of monoalkyl derivatives of a phenetol sulfonate of which the alkyl groups are derived from a paraffinic petroleum kerosene 80 per cent of which kerosene boils within the range 210° to 265° C.

25. A mixture of monoalkyl derivatives of a hydroxy-aromatic sulfonate of which the alkyl groups are derived from a petroleum distillate of which at least 80 per cent boils between 210° and 320° C. and over a maximum range of 55° C.

26. A mixture of monoalkyl derivatives of a phenol monosulfonate of which the alkyl groups are derived from a petroleum distillate of which at least 80 per cent boils between 235° and 320° C. and over a maximum range of 55° C.

27. A mixture of monoalkyl derivatives of a phenol monosulfonate of which the alkyl groups are derived from a paraffinic petroleum kerosene 80 per cent of which kerosene boils within the range 235° to 320° C. and over a maximum range of 55° C.

LAWRENCE H. FLETT.